Oct. 25, 1927.
J. H. WILSON
1,646,778
APPARATUS FOR COOKING
Filed Sept. 22, 1926
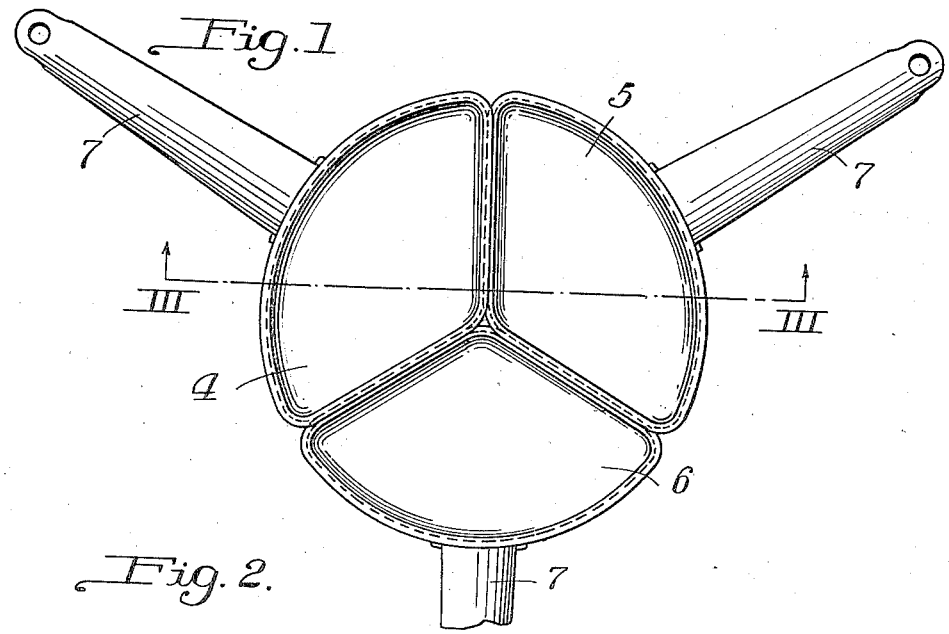
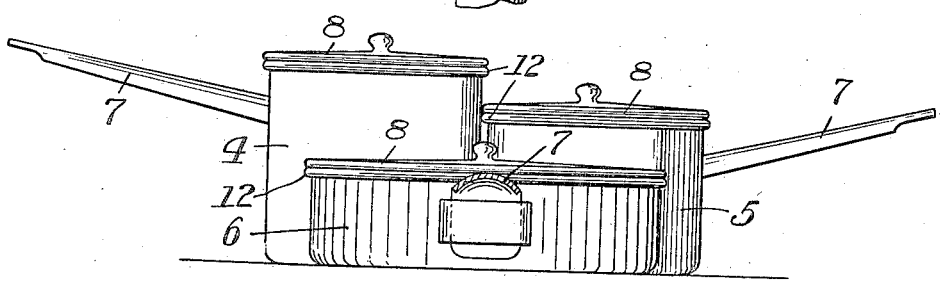
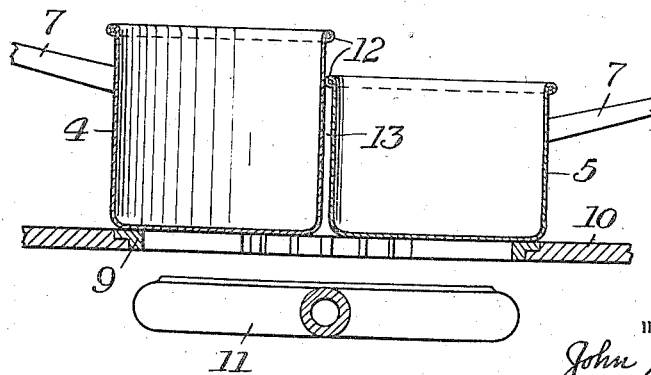
INVENTOR
John H. Wilson
By Archworth Martin
Attorney.

Patented Oct. 25, 1927.

1,646,778

UNITED STATES PATENT OFFICE.

JOHN H. WILSON, OF NEW KENSINGTON, PENNSYLVANIA, ASSIGNOR TO THE ALUMINUM COOKING UTENSIL CO., OF NEW KENSINGTON, PENNSYLVANIA, A CORPORATION OF PENNSYLVANIA.

APPARATUS FOR COOKING.

Application filed September 22, 1926. Serial No. 136,922.

My invention relates to a method of an apparatus for cooking, with particular reference to the cooking of foods such as fruits and vegetables while in an undried condition.

One object of my invention is to provide an improved method of cooking whereby there is a minimum loss of food flavors, mineral salts, and vegetable sugars.

Another object of my invention is to provide sector shaped cooking utensils of such form that when assembled over a burner the heat will be prevented from escaping upwardly past the utensils.

A further object of my invention is to provide a cover for a cooking vessel, which is of a definite weight relative to the diameter of the vessel, whereby steam, at the higher temperatures will be permitted to escape, but vapors, at lower temperatures, will be retained in the vessel.

Still another object of my invention is to simplify and improve cooking methods and apparatus, generally.

In the cooking art, foods have been placed in vessels of sector form that are assembled over a single burner, thereby enabling the housewife to cook several foods simultaneously, by the use of a single burner. However the vessels comprising a given group have been of the same height, with the result that a small amount of peas, for instance, has been placed in a vessel much larger than required, the vessels all being made of such capacity as to accommodate foods such as potatoes and cabbage that are commonly cooked in larger quantities than some of the smaller vegetables or fruits.

The arrangement just referred to does not lend itself readily to the cooking of fruits and vegetables without water, wherein the vapors from the natural juices are relied upon to assist in the cooking operation, for the reason that vapors from a small amount of food would fill the vacant space above such food, thereby becoming lost and performing no cooking function. Also, the foods dry out and sometimes burn. It is highly advantageous to cook green or fresh foods such as fruits or vegetables without water, in order to retain the mineral salts and vegetable sugars that are dissolved and lost when the foods are cooked in water, even though only a small quantity of water be employed.

Furthermore, there has been no attempt made to retain the vapors and nevertheless permit escape of steam at higher temperatures. I propose to cook the foods at temperatures not substantially greater than 212° F., thus conserving the vitamin of the food. In order to accomplish this result, I permit the escape of steam which is developed at 212° F. and upwards; to thereby warn the chef that the heat beneath the vessel must be reduced.

The vessels of the prior art have been commonly provided with flanges or beads at their upper edges and the bead on one vessel will abut against the beads of adjacent vessels, thus leaving considerable space between the vertical walls of the vessels from which the gases of combuston rapidly flow. By making the vessels of a given group of different heights, the beads of the higher vessels do not abut against the beads of the lower vessels, although the beads of the lower vessels will abut against the vertical surfaces of the higher vessels. The spaces between the vessels are thereby narrowed, thus reducing the tendency of the heated gases to pass rapidly from between the vessels, and facilitating radiation of heat back and forth between adjacent surfaces.

Means whereby my invention may be practiced are shown in the accompanying drawing wherein Figure 1 is a plan view of a group of cooking vessels constructed in accordance with my invention; Fig. 2 is an elevational view thereof, and Fig. 3 is a view taken on the line III—III of Fig. 1, and showing the vessels in position upon a stove.

While I herein show and describe the vessels as of sector form, it will be understood that they may be of various other shapes. The cooking utensils 4, 5 and 6 are provided with suitable handles 7 and covers 8, and are all of non-uniform height, as shown more clearly in Fig. 2. The vessels are adapted to be arranged in compact formation upon a grid 9, that is shown as mounted in a stove top 10, and are disposed above a circular gas burner 11. A rib or bead 12 is provided on the upper edge of each of the vessels. These beads, in the case of the vessels 5 and 6, abut against vertical walls of the vessel 4, while the rib of vessel 6 abuts against one wall of the vessel 5. Spaces such as indicated at 13 (Fig. 3) are thus present between the vessels and escape of heated gases upwardly from such spaces is prevented by the beads 12. The heat which rises into the spaces 13 is radiated back and forth between the walls of such spaces and is absorbed by the walls, so as to conserve the heat and hasten the cooking.

The covers 8 are of such weight that, at steam pressure of .008 lbs. per square inch within the vessel they will be forced up slightly, to permit escape of steam. In vessels of capacity not greatly in excess of the bulk of the contents, this pressure will be developed at approximately 212° F., at which point the formation of steam in considerable quantity commences, as compared to mere vapors at lower temperatures. When the chef observes that steam is escaping, he will understand that valuable nutritive elements are being cooked out of the food and that the food is in danger of becoming dried, and will thereupon lower the gas flame.

It will be understood that the principle of employing a cover of predetermined weight relative to size of its vessel may be applied to a vessel which is of a form other than that shown in the drawing, and that materials other than food may be cooked as described.

I claim as my invention:

1. Cooking apparatus comprising a group of vessels of different heights and each provided with a flange on its upper portion, the vessels being of sector form in cross section and assemblable in the form of a circle, whereby the flanges of said vessels provide heat retaining spaces between adjacent vessels.

2. Cooking utensils comprising in combination a plurality of vessels of different heights and of substantially triangular form and having flanged upper edges which, due to the different heights of the vessels, engage the side walls of adjacent vessels when said vessels are grouped to provide heat retaining chambers.

In testimony whereof I, the said JOHN H. WILSON, have hereunto set my hand.

JOHN H. WILSON.